(12) United States Patent
Matsuoka et al.

(10) Patent No.: US 10,274,047 B2
(45) Date of Patent: Apr. 30, 2019

(54) PLANETARY GEAR DEVICE WITH INWARD FLANGE HAVING RECESSES

(71) Applicant: KAWASAKI JUKOGYO KABUSHIKI KAISHA, Hyogo, Kobe-shi (JP)

(72) Inventors: Tetsuya Matsuoka, Kakogawa (JP); Hiroyasu Nishikawa, Kobe (JP); Takahiko Banno, Kobe (JP); Masato Asahara, Akashi (JP); Kazuhiro Sato, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 0 days.

(21) Appl. No.: 15/716,782

(22) Filed: Sep. 27, 2017

(65) Prior Publication Data

US 2018/0038448 A1 Feb. 8, 2018

Related U.S. Application Data

(63) Continuation of application No. PCT/JP2016/057138, filed on Mar. 8, 2016.

(30) Foreign Application Priority Data

Mar. 30, 2015 (JP) ................. 2015-069325

(51) Int. Cl.
*F16H 57/08* (2006.01)
*F16H 1/28* (2006.01)
(Continued)

(52) U.S. Cl.
CPC ............. *F16H 1/28* (2013.01); *F16H 57/023* (2013.01); *F16H 57/08* (2013.01); *F02C 7/36* (2013.01); *F05D 2260/40311* (2013.01)

(58) Field of Classification Search
CPC .......... F16H 1/28; F16H 57/023; F16H 57/08; F16H 57/082; F16H 1/2836; F05D 2260/40311; F02C 7/36; Y02T 50/671
See application file for complete search history.

(56) References Cited

U.S. PATENT DOCUMENTS

| 5,433,674 A | 7/1995 | Sheridan et al. |
| 8,968,148 B2 | 3/2015 | Matsuoka et al. |

(Continued)

FOREIGN PATENT DOCUMENTS

| JP | 2000-002306 A | 1/2000 |
| JP | 2012-112454 A | 6/2012 |
| WO | 2012/070199 A1 | 5/2012 |

OTHER PUBLICATIONS

International Preliminary Report on Patentability with the translation of Written Opinion dated Oct. 12, 2017 issued by the International Bureau in International application No. PCT/JP2016/057138.

(Continued)

*Primary Examiner* — Jacob S. Scott
*Assistant Examiner* — Lillian T Nguyen
(74) *Attorney, Agent, or Firm* — Sughrue Mion, PLLC

(57) ABSTRACT

In a planetary gear device including: a sun gear; a plurality of planet gears; a ring gear; and a tubular support member connected to the ring gear so as to rotate together with the ring gear; an outward flange provided at the ring gear and projecting radially outward and extend over an entire periphery thereof; an wavy inward flange provided at the tubular support member and having a plurality of projection pieces projecting radially inward over an entire periphery thereof, the outward flange and the inward flange are fastened to each other by means of bolts and nuts, and the inward flange has a plurality of recesses formed between the plurality of projection pieces and the plurality of recesses include shal- (Continued)

low first recesses and second recesses deeper than the first recesses such that depth of the recesses becomes greater at regular intervals.

6 Claims, 6 Drawing Sheets

(51) Int. Cl.
  *F16H 57/023* (2012.01)
  *F02C 7/36* (2006.01)

(56) References Cited

U.S. PATENT DOCUMENTS

2011/0105270 A1* 5/2011 Matsuoka .................. F02C 7/36
   475/331
2013/0310213 A1 11/2013 Matsuoka et al.

OTHER PUBLICATIONS

International Search Report of PCT/JP2016/057138 dated Jun. 14, 2016 [PCT/ISA/210].

* cited by examiner

PLANETARY GEAR DEVICE WITH INWARD FLANGE HAVING RECESSES

CROSS REFERENCE TO THE RELATED APPLICATION

This application is a continuation application, under 35 U.S.C. § 111(a), of international application No. PCT/JP2016/057138, filed Mar. 8, 2016, which claims priority to Japanese patent application No. 2015-069325, filed Mar. 30, 2015, the disclosure of which are incorporated by reference in their entirety into this application.

BACKGROUND OF THE INVENTION

Field of the Invention

The present invention relates to a planetary gear device for use in a power transmission mechanism of an aircraft or the like.

Description of Related Art

Conventionally, such a type of planetary gear device includes a sun gear that has external teeth, a plurality of planet gears that have external teeth and mesh with the sun gear, a common planet carrier that supports a rotation shaft for each planet gear and positions the plurality of planet gears relative to each other, and a ring gear that has internal teeth and meshes with the plurality of planet gears (see, for example, Patent Document 1). Power generated by a power source such as a gas turbine engine is first inputted to the sun gear and then transmitted to the planet gears, for example. The power transmitted to the planet gears can be taken out as two types of different outputs, that is, as rotation power of the ring gear generated by rotation of the planet gears and rotation power of the planet carrier generated by revolution of the planet gears about the sun gear.

For example, in the case where a propeller is mounted at an end of a one-end-supported rotation shaft supported by an engine structure as in a planetary gear device for an aircraft engine, bending moment acts on the engine during operation of an aircraft and bending deformation occurs in the engine structure. Due to influence of the bending deformation of the engine structure, bending deformation may also occur in the entire planetary gear device. Due to the bending deformation, a state where the parallelism between the planet gears and the sun gear and the ring gear, which mesh with the planet gears, is shifted, that is, misalignment, occurs. When misalignment occurs, partial contact of the gear or a bearing occurs.

As a technique to achieve both ensuring rigidity and preventing misalignment without causing an increase in the weight of the entire planetary gear device, the following has been proposed. A flexible structure portion having low rigidity is provided only to a tubular support member connected to the ring gear by means of a bolt, of input/output members that support the device, thereby ensuring rigidity sufficient to prevent whirling of the device, and also deformation of the engine due to a flight load is absorbed by the flexible structure portion, thereby preventing occurrence of misalignment (see Patent Document 2).

RELATED DOCUMENT

Patent Document

[Patent Document 1] U.S. Pat. No. 5,433,674
[Patent Document 2] JP Laid-open Patent Publication No. 2012-112454

SUMMARY OF THE INVENTION

A radial load is periodically applied to a portion where the ring gear and the tubular support member that are located at an outer peripheral portion of the planetary gear device are connected to each other, that is, to flanges for bolt insertion, due to revolution of the planet gears. In the case where there is a great difference in rigidity between the flange of the ring gear and the flange of the tubular support member, a displacement difference is produced between the flange of the ring gear and the flange of the tubular support member due to the above radial load, and fretting may occur between the surfaces of both flanges. In order to prevent such fretting, for example, increasing a bolt diameter or using a reamer bolt for ensuring bolt axial tension that can be transmitted with friction between both flanges is conceivable but is not preferable in terms of weight, processing cost, and the like.

In order to solve the above-described problems, an object of the present invention is to provide a planetary gear device that is able to prevent occurrence of fretting between a ring gear and a tubular support member without causing an increase in the weight of the entire device and has excellent life performance.

To attain the above-described object, a planetary gear device according to the present invention includes: a sun gear having external teeth and coaxially fixed to a power input shaft; a plurality of planet gears each having external teeth and meshing with the sun gear; a ring gear having internal teeth and meshing with the plurality of planet gears; a tubular support member connected to the ring gear so as to rotate together with the ring gear and supporting the ring gear, an outward flange provided at the ring gear so as to project radially outward and extend over an entire periphery of the ring gear, and an inward flange of a wavy shape provided at the tubular support member and having a plurality of projection pieces projecting radially inward over an entire periphery of the tubular support member. The outward flange and the inward flange are fastened to each other by means of bolts and nuts thereby to connect the ring gear and the tubular support member to each other, and the inward flange has a plurality of recesses formed between the plurality of projection pieces and the plurality of recesses include shallow first recesses and second recesses deeper than the first recesses such that depth of the recesses becomes greater at regular intervals.

In this specification, the "depth of the recess" refers to a radial position of a bottom portion (outermost diameter side portion) of the recess recessed outward in the radial direction. Accordingly, a recess being "deep" means that a bottom portion of the recess is located at a further outer diameter side, and the recess being "shallow" means that the bottom portion of the recess is located at a further inner diameter side.

According to this configuration, since the wavy flange is provided at an outer peripheral portion of the ring gear, the weight of the planetary gear device can be reduced while desired rigidity of the ring gear is ensured. In addition, by making the depth of the recesses between the projection pieces of the tubular support member greater at regular intervals, the rigidity in the radial direction of the entire inward flange of the tubular support member is reduced while the rigidity of the projections pieces required with respect to driving torque is ensured, so that the tubular support member can be caused to easily follow deformation of the ring gear. Accordingly, even when a radial load generated by revolution of the planet gears is received, the displacement difference between the inward flange of the tubular support member and the outward flange of the ring gear is reduced, so that occurrence of fretting between the flange surfaces can be prevented.

In one embodiment of the present invention, the inward flange may be formed with a plurality of bolt insertion holes through which the bolts are inserted, the second recesses may be set so as to be deeper than a circumference of a virtual circle that circumscribes the plurality of bolt insertion holes, and the first recesses may be set so as to be shallower than the circumference of the virtual circle. According to this configuration, since portions at the inner diameter side with respect to the outermost diameter side portions of the bolt insertion holes are present at the shallow recesses, the rigidity of the projection pieces required to suppress deformation due to driving torque can be ensured.

In one embodiment of the present invention, a plurality of rotation prevention plates configured to prevent the nuts from being loosened may be mounted on the inward flange so as to be spaced apart from each other at a predetermined interval in a circumferential direction, and the second recesses may be located in the inward flange at portions in the circumferential direction at which no rotation prevention plate is present and the first recesses are located in the inward flange at portions in the circumferential direction at which the rotation prevention plates are present so that the recesses are deeper at regular intervals. According to this configuration, while the efficiency of assembling work is enhanced by providing the rotation prevention plates and fixing the nuts, occurrence of the fretting between the flange surfaces can be prevented by decreasing the rigidity of the inward flange of the tubular support member and the rigidity of the rotation prevention plates.

In one embodiment of the present invention, for example, one rotation prevention plate may be provided for two to five nuts arranged continuously, and one second recess is formed every two to five recesses located continuously. According to this configuration, falling deformation and torsional deformation of the projection pieces due to driving torque can be effectively suppressed by ensuring the shallow recesses, and stress due to revolution of the planet gears can be prevented from acting locally, by arranging portions having low rigidity evenly over the entire periphery of the inward flange.

In one embodiment of the present invention, each rotation prevention plate may have an inner diameter side edge portion formed in a wavy shape having projections projecting in a radial direction of the tubular support member and recesses recessed in the radial direction of the tubular support member, and may be disposed such that circumferential positions of the recesses of the rotation prevention plate correspond to circumferential positions of the recesses of the inward flange, and the recesses of each rotation prevention plate may be shallower than the recesses of the inward flange. According to this configuration, the strength of the rotation prevention plates composed of plate-like members that do not have tubular portions is sufficiently ensured.

In one embodiment of the present invention, each rotation prevention plate may be mounted on the inward flange via a plurality of fixing pins provided to the inward flange, and the plurality of the fixing pins may be disposed at an outer diameter side of the first recesses so as to be spaced apart from each other in a circumferential direction. According to this configuration, the nuts fixed to the rotation prevention plates can be prevented from rotating together with the bolts in fastening the bolts, so that the efficiency of the assembling work further improves.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
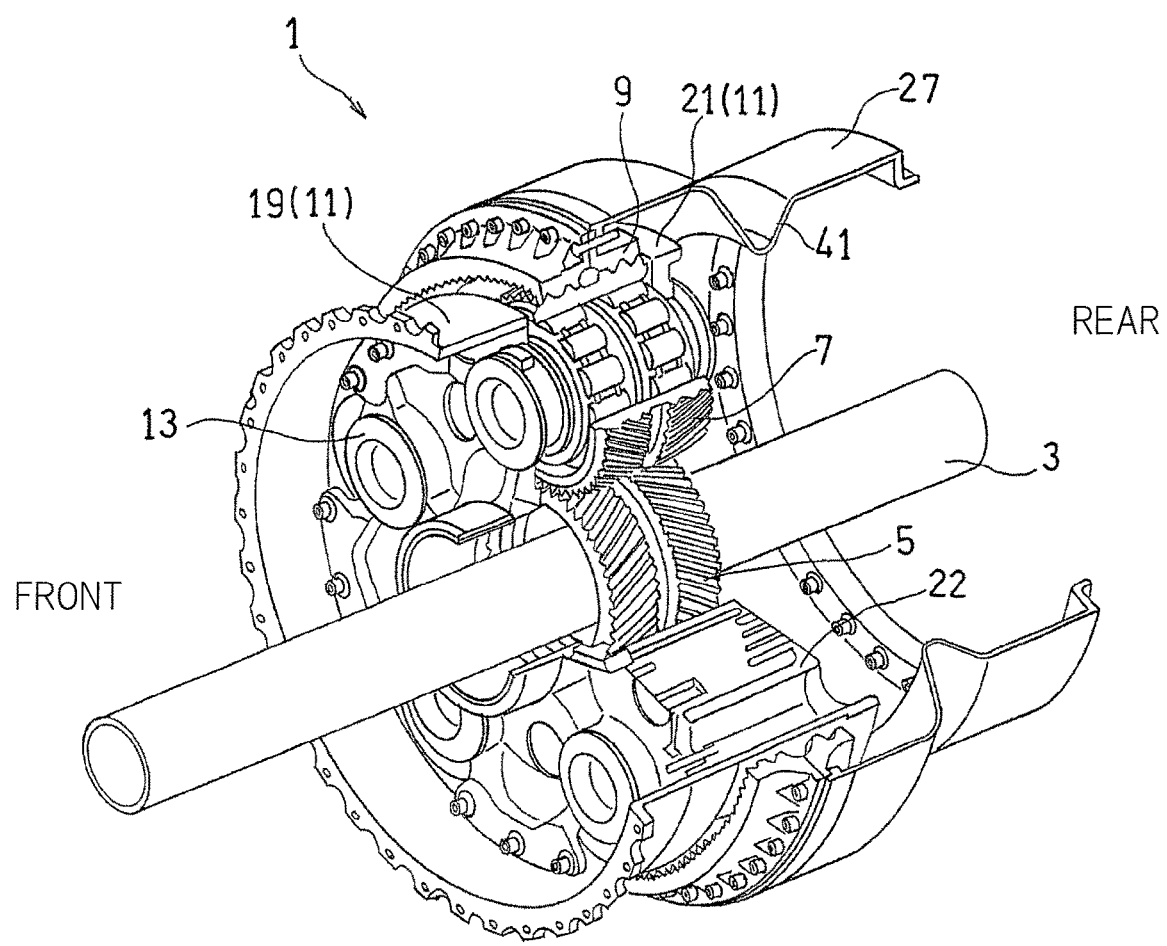
FIG. 1 is a partially cutaway perspective view showing a planetary gear device according to one embodiment of the present invention.

Hereinafter, embodiments of the present invention will be described with reference to the drawings. FIG. 1 is a perspective view showing a planetary gear device 1 according to an embodiment of the present invention. The planetary gear device 1 is installed, for example, in a propeller propulsion aircraft engine, and is connected to a gas turbine engine, which is not shown, via an input shaft 3. The planetary gear device 1 transmits power of the gas turbine engine to two rotors, which are not shown, as independent outputs, respectively. The planetary gear device 1 may be used for transmitting power to be outputted only to one rotor. In the following description, a side, in an axial direction, at which the gas turbine engine is disposed (the left side in FIG. 1) is referred to as a front side, and the opposite side is referred to as a rear side. In addition, unless otherwise specified, the term "radial direction" refers to a radial direction about an axis C1 that is the same as that of the input shaft 3 described later.

Figure 2:
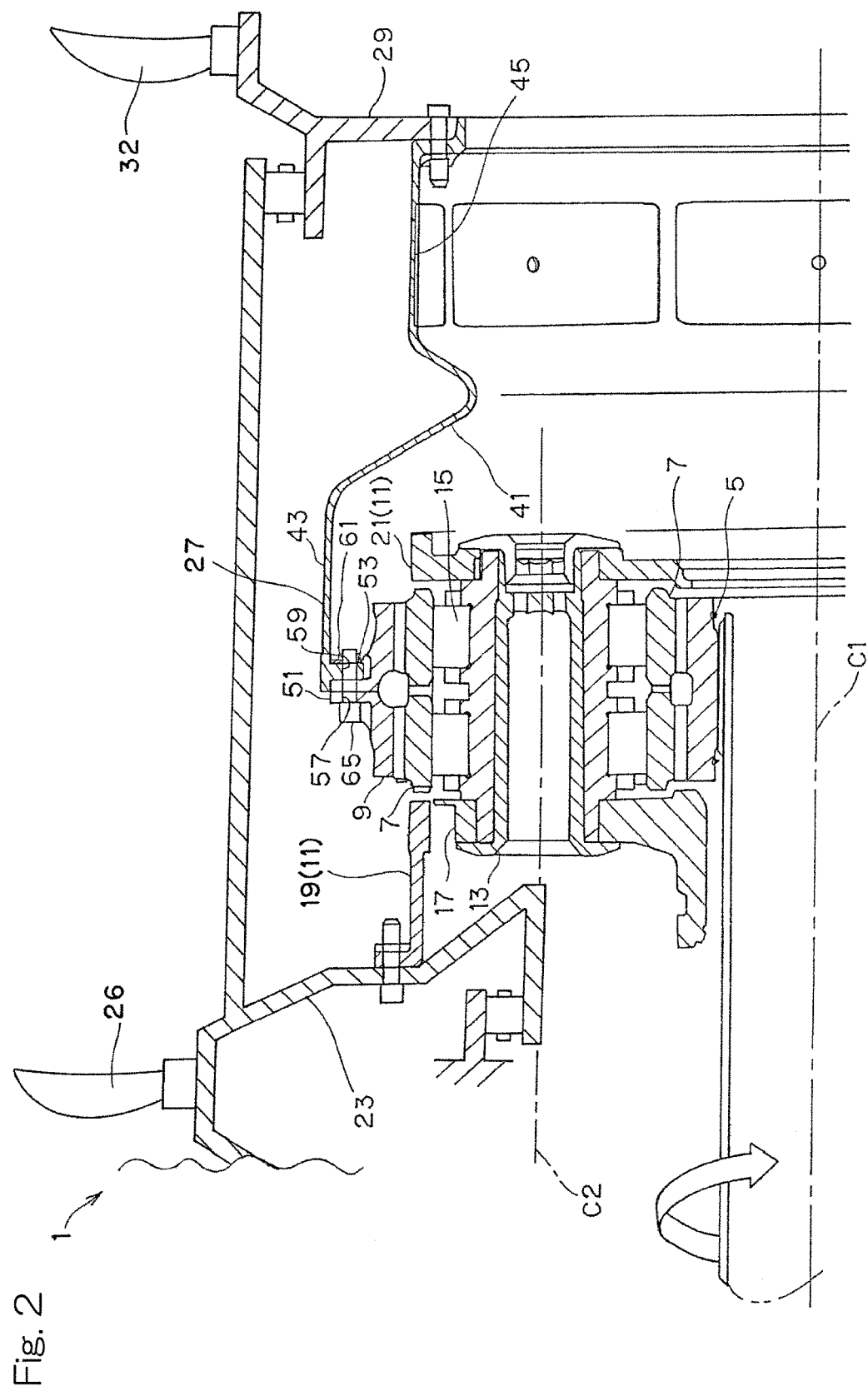
FIG. 2 is a longitudinal cross-sectional view of the planetary gear device in FIG. 1.

FIG. 2 is a longitudinal cross-sectional view showing the planetary gear device 1 in FIG. 1. As shown in FIG. 2, the planetary gear device 1 is configured as a double-row gear mechanism. The planetary gear device 1 includes a sun gear 5, a plurality of planet gears 7, a ring gear 9, a planet carrier 11, and planet shafts 13. The sun gear 5 is a double-row helical gear that includes two helical gears each having external teeth, and the external teeth of the two helical gears are inclined in directions opposite to each other. The sun gear 5 is fitted on the outer periphery of the input shaft 3 that serves as a rotary shaft. Each planet gear 7 is a double-row helical gear that corresponds to the sun gear 5 and includes two helical gears each having external teeth. Each planet gear 7 meshes with the sun gear 5 in a slate where the planet gear 7 is rotatably mounted via a double row bearing 15 to the outer periphery of a corresponding one of the planet shafts 13 that are hollow and serve as rotary shafts. In the present embodiment, five planet gears 7 are arranged at equal intervals in the circumferential direction of the sun gear 5. The ring gear 9 is a double-row helical gear that includes two helical gears each having internal teeth. The ring gear 9 meshes with the planet gears 7. Each gear is not limited to the helical gear, and may be, for example, a spur gear.

Each of the planet shafts 13 for the plurality of planet gears 7 is supported at a front end portion thereof by an annular front plate 17 having the axis C1 that is the same as that of the input shaft 3. The front plate 17 is connected to an inner peripheral portion of a stub shaft 19, which is a cylindrical shaft disposed coaxially with the front plate 17, by means of a plurality of bolts. A back plate 21 is connected at the back side of the front plate 17. A plurality of pillars 22 (FIG. 1) are formed so as to be integrated with the back plate 21 and spaced apart from each other at equal intervals in the circumferential direction. The back plate 21 is bolted to the front plate 17 via these pillars 22. the back plate 21 supports rear end portions of the planet shafts 13. In this manner, the stub shaft 19, and the front plate 17 and the back plate 21 that are connected to each other via the stub shaft 19 cooperatively form the planet carrier 11 that supports the planet shafts 13 and the planet gears 7. The planet carrier 11 sets the positions of the respective planet shafts 13 relative to each other, that is, the positions of the respective planet gears 7 relative to each other.

A front end portion of the stub shaft 19 is connected to a front output shaft 23 that is coaxial with the input shaft 3. Power generated by revolution of the plurality of planet gears 7 about the axis C1 is outputted as driving force to, for example, a propeller 26 at the front side via the stub shaft 19 and the front output shaft 23. Meanwhile, the ring gear 9 is connected to a flex support 27 that is a tubular support member disposed coaxially with the input shaft 3. A rear end portion of the flex support 27 is connected to a rear output shaft 29 that is coaxial with the input shaft 3. A connection structure for connecting the ring gear 9 with the flex support 27 will be described in detail later. Power generated by rotation of the planet gears 7 about a rotation axis C2 is outputted as driving force to, for example, a propeller 32 at the rear side via the ring gear 9, the flex support 27, and the rear output shaft 29.

In this manner, the planetary gear device 1 is entirely supported at the front thereof by the input shaft 3 and the stub shaft 19 and at the rear thereof by the flex support 27 that supports the ring gear 9. The input shaft 3 and the stub shaft 19 (the planet carrier 11) are formed as members having high rigidity. Meanwhile, the flex support 27 is formed as a member that has low rigidity including a flexible structure portion 41 having a longitudinal cross-section with a V shape recessed at the radially inner side. In the present embodiment, the flex support 27 includes a large-diameter cylindrical portion 43 formed at the ring gear 9 side and a small-diameter cylindrical portion 45 formed at the rear output side, and the flexible structure portion 41 is formed between these cylindrical portions 43 and 45.

Figure 3:
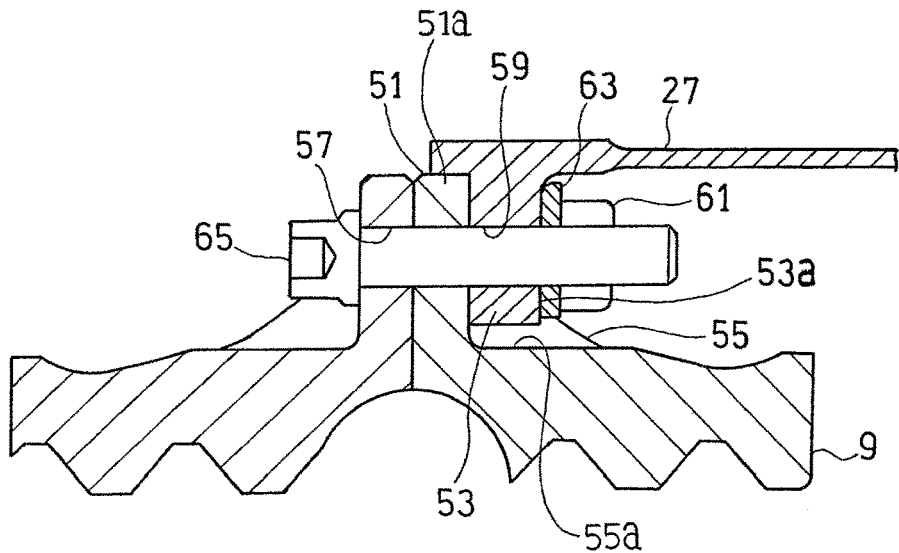
FIG. 3 is a longitudinal cross-sectional view showing an area surrounding a counter bore of an inward flange of a flex support in FIG. 2 in an enlarged manner.

Next, the connection structure for connecting the ring gear 9 with the flex support 27 will be described. As shown in FIG. 3, an outward flange 51 is provided at an outer peripheral portion of the ring gear 9 so as to project radially outward in the radial direction. Meanwhile, an inward flange 53 is provided at an inner peripheral portion of a front end portion of the flex support 27 so as to project inward in the radial direction. The outward flange 51 of the ring gear 9 is provided over the entire periphery of the outer peripheral portion of the ring gear 9. The inward flange 53 of the flex support 27 is provided over the entire periphery of the inner peripheral portion of the flex support 27.

Figure 4:
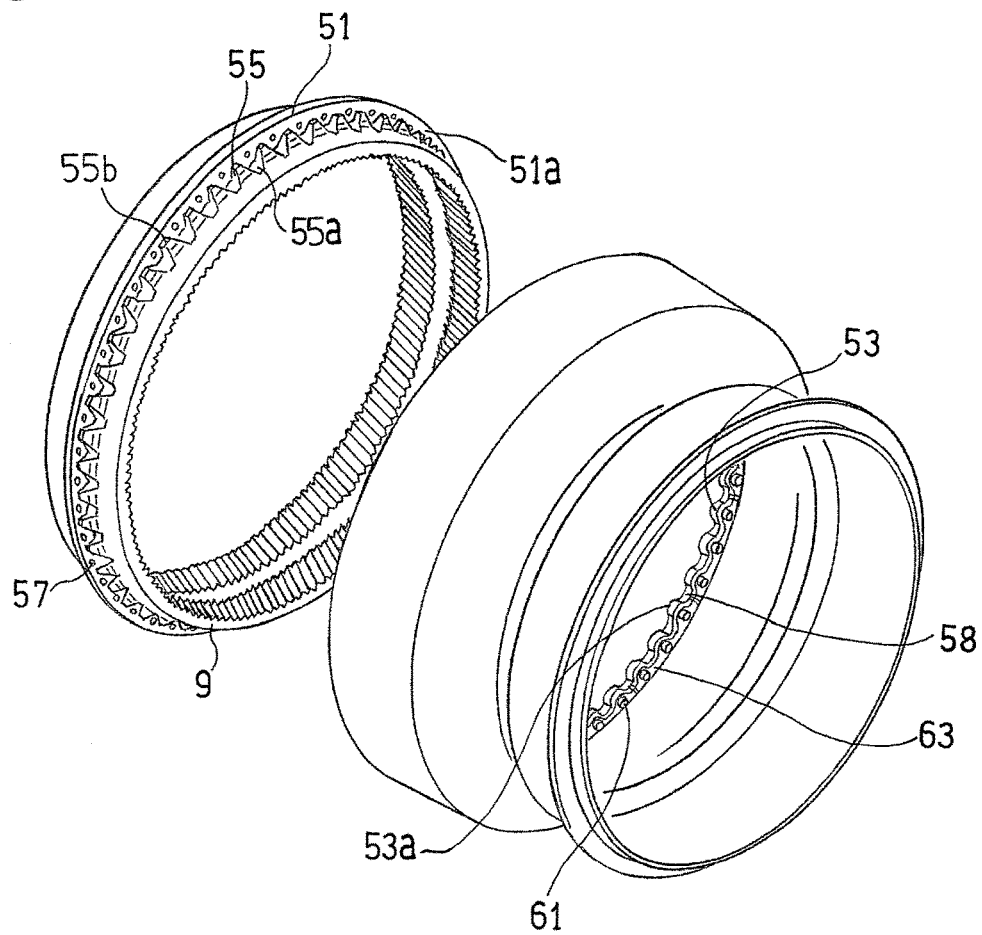
FIG. 4 is an exploded perspective view showing a connection structure of a ring gear and the flex support of the planetary gear device in FIG. 1.

As shown in FIG. 4, each of the outward flange 51 and the inward flange 53 is formed in a chevron shape in which a plurality of wavy shapes are arranged continuously in the circumferential direction. Specifically, the outward flange 51 of the ring gear 9 includes a flange main body 51a projecting in the radial direction in a plate shape, and an annular connection wall 55. The annular connection wall 55 extends at an inclination in the axial direction from a surface of the flange main body 51a that faces toward the flex support 27 side. A plurality of recesses 55a are formed on the annular connection wall 55 at equal intervals over the entire periphery in the circumferential direction so as to be recessed toward the radially inner side, and portions between the recesses 55a form hill portions 55b. That is, in the outward flange 51, the recesses 55a and the hill portions 55b of the annular connection wall 55 are provided continuously at equal intervals over the entire periphery in the circumferential direction. The provision of the annular connection wall 55 to the ring gear 9 prevents warping of an axial end portion of the ring gear 9. Bolt insertion holes 57 are provided in the flange main body 51a and at respective positions in the circumferential direction corresponding to the recesses 55a of the connection wall 55, so as to penetrate the flange main body 51a in the axial direction.

Figure 5:
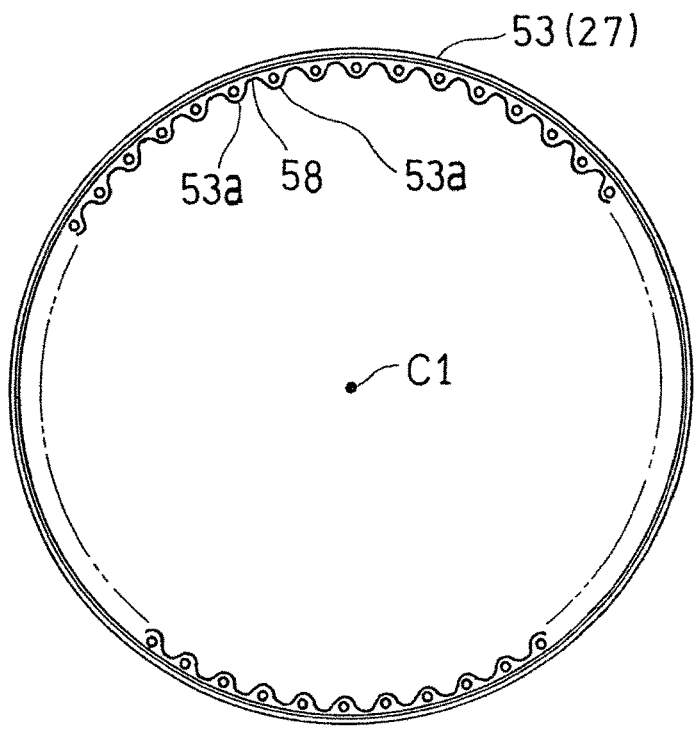
FIG. 5 is a front view showing the inward flange of the flex support in FIG. 2.

The inward flange 53 of the flex support 27 is formed in a wavy shape having a plurality of projection pieces 53a projecting inward in the radial direction. The projection pieces 53a are provided at equal intervals over the entire periphery of the inward flange 53. As shown in FIG. 5, the respective projection pieces 53a of the inward flange 53 correspond to hill portions of the wavy shape, and a recess (hereinafter, referred to as "inward flange recess") 58 of the wavy shape is formed between any adjacent projection pieces 53a. In addition, as shown in FIG. 3, a bolt insertion hole 59 is formed in each projection piece 53a so as to penetrate the projection piece 53a in the axial direction.

A rotation prevention plate 63 that prevents connection nuts 61 from being loosened is provided at the inward flange 53 side of the flex support 27. Each connection nut 61 is fixed to the rotation prevention plate 63 in a state where rotation of the connection nuts 61 is prevented, for example, by a rivet. The connection nuts 61 may be fixed to the rotation prevention plate 63 by another method, for example, by welding.

In a state where the outward flange 51 and the inward flange 53 are fitted to each other such that axial end surfaces, of the hill portions of the inward flange 53 of the flex support 27, that is, of the projection pieces 53a, overlap the recesses 55a of the outward flange 51 of the ring gear 9 shown in FIG. 4; the ring gear 9 and the flex support 27 are connected to each other so as to rotate together, by inserting connection bolts 65 through the bolt insertion holes 57 and 59 from the ring gear 9 side and screwing the connection bolts 65 into the connection nuts 61 fixed to the rotation prevention plate 63, as shown in FIG. 3. When the outward flange 51 and the inward flange 53 are connected to each other, the hill portions 55b of the connection wall 55 are fitted into respective inward flange recesses 58. Thus, interference between the inward flange 53 and the hill portions 55b of the connection wall 55 is avoided.

Figure 6:
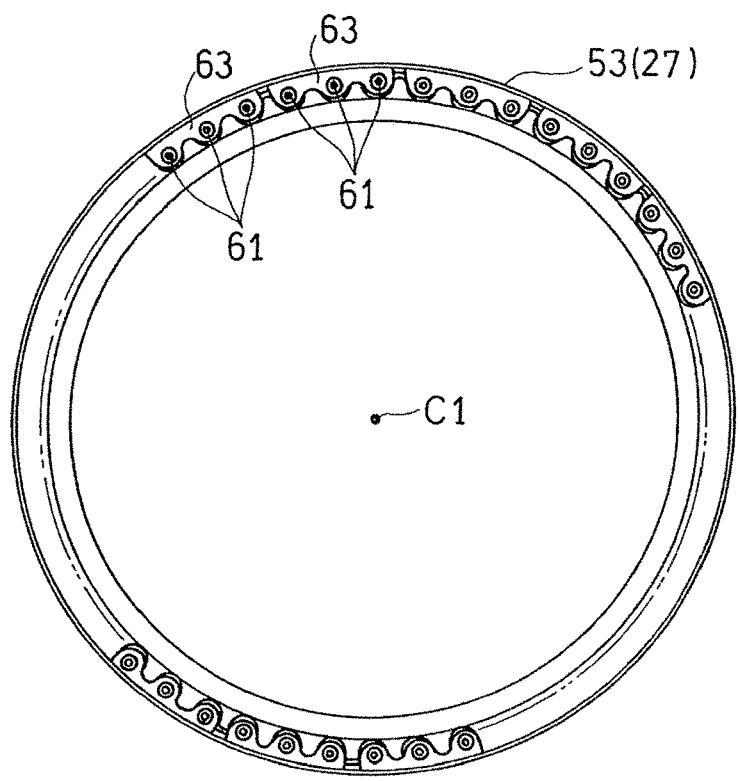
FIG. 6 is a front view showing a state where rotation prevention plates are mounted on the inward flange of the flex support in FIG. 2.

In the present embodiment, as shown in FIG. 6, a plurality of rotation prevention plates 63 are provided so as to be spaced apart from each other at predetermined intervals in the circumferential direction. A plurality of (three in the shown example) connection nuts 61 are mounted on each rotation prevention plate 63. Each rotation prevention plate 63 is mounted on the inward flange 53 of the flex support 27 by means of fixing pins 67 shown in FIG. 7. In the shown example, a plurality of (two in the shown example) fixing pins 67 are provided on an outer peripheral portion of the one rotation prevention plate 63 and at positions spaced apart from each other in the circumferential direction. The number and the arrangement of the fixing pins 67 may be arbitrarily set. However, when the fixing pins 67 are arranged as shown, the connection nuts 61 fixed to the rotation prevention plates 63 can be prevented from rotating together with the connection bolts 65 in fastening the connection bolts 65.

Figure 7:
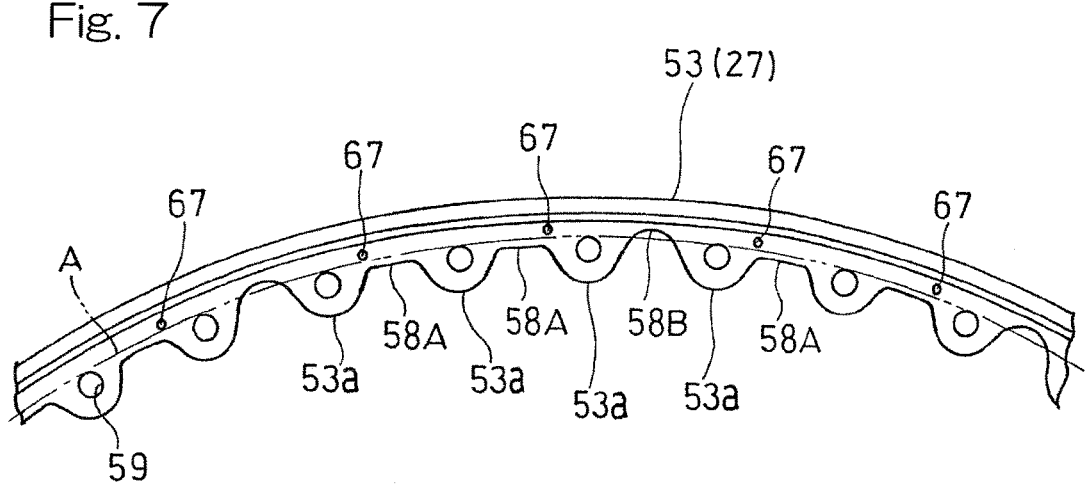
FIG. 7 is a front view showing the inward flange in FIG. 5 in an enlarged manner.

As shown in FIG. 7, the inward flange 53 of the flex support 27 is formed such that depth of the plurality of the inward flange recesses 58 becomes greater at regular intervals (i.e., at predetermined circumferential intervals). That is, shallow first inward flange recesses 58A and deep second inward flange recesses 58B deeper than the first inward flange recesses 58A are formed as the inward flange recesses 58 on the inward flange 53, and these two types of recesses 58A and 58B are arranged at regular intervals. In the following description, the first inward flange recesses 58A may be referred to as "shallow inward flange recesses 58A", and the second inward flange recesses 58B may be referred to as "deep inward flange recesses 58B". In addition, as necessary, the first inward flange recesses 58A and the second inward flange recesses 58B may be collectively referred to as "inward flange recesses 58".

In the present embodiment, the deep inward flange recesses 58B are set so as to be deeper than a circumference A of a virtual circle that circumscribes the multiple bolt insertion holes 59 provided in the inward flange 53, and the shallow inward flange recesses 58A are set so as to be shallower than the circumference A of the virtual circle.

Figure 8:
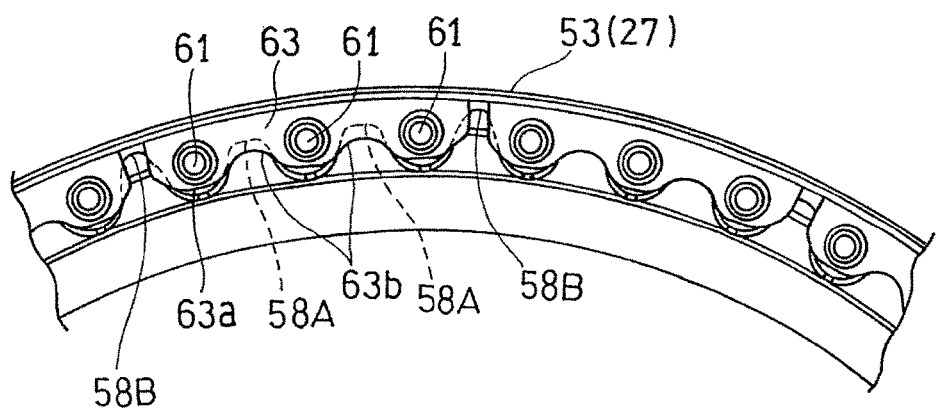
FIG. 8 is a front view showing a state where the rotation prevention plates are mounted on the inward flange in FIG. 6, in an enlarged manner.

In addition, in the present embodiment, the inward flange recesses 58 located at portions in the circumferential direction at which no rotation prevention plate 63 is present are set so as to be deeper than the inward flange recesses 58 located at portions in the circumferential direction at which the rotation prevention plates 63 are present, whereby the inward flange recesses 58 of the flex support 27 are formed such that the inward flange recesses 58 are deeper at regular intervals. In the present embodiment, specifically, as shown in FIG. 8, bottom portions of the inward flange recesses 58 located at the portions in the circumferential direction at which no rotation prevention plate 63 is present are located at the radially outer side with respect to bottom portions of the inward flange recesses 58 located at the portions in the circumferential direction at which the rotation prevention plates 63 are present. In the present embodiment, as described above, since one rotation prevention plate 63 is provided for three connection nuts 61 that are continuously arranged, one inward flange recess 58B deeper than the shallow inward flange recesses 58A located at the portions in the circumferential direction at which the rotation prevention plates 63 are present is formed on the inward flange 53 of the flex support 27 every three inward flange recesses 58 located continuously in the circumferential direction (i.e., every three pitches).

Figure 9:
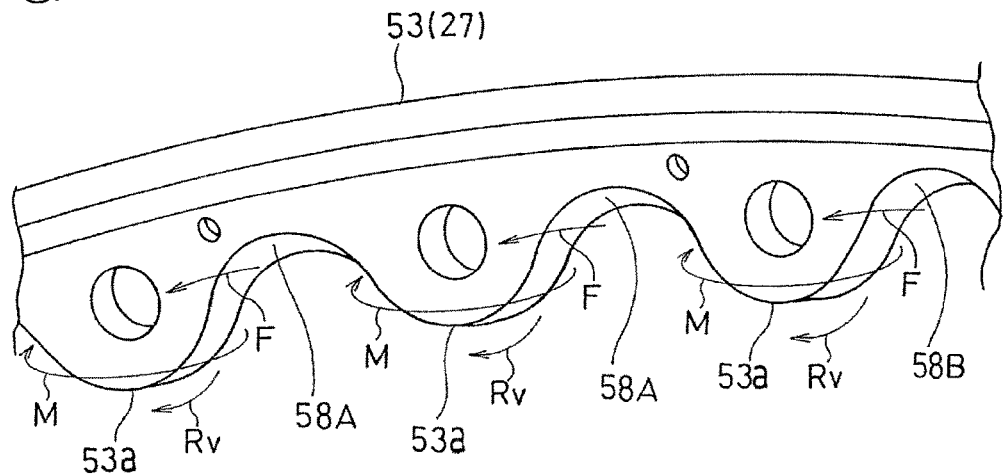
FIG. 9 is a perspective view showing the inward flange of the flex support in FIG. 2 in an enlarged manner.

In the present embodiment, all the inward flange recesses 58 are not made uniformly deep, but the inward flange recesses 58 are made deeper at regular intervals, that is, the shallow inward flange recesses 58A and the deep inward flange recesses 58B are arranged at regular intervals, for the following reason. As shown in FIG. 9, circumferential falling deformation in a direction Rv, which is opposite to the rotation direction, occurs in the projection pieces 53a due to driving torque. Furthermore, the projection pieces 53a receive shear force F at the surfaces thereof in contact with the outward flange 51 (FIG. 3) of the ring gear 9. The shear force F does not act on the opposite surfaces of the projection pieces 53a, and thus the projection pieces 53a receive moment M and torsional deformation occurs therein. In order to ensure rigidity required for suppressing these deformations, the number of the deep recesses 58B among the inward flange recesses 58 between the plurality of projection pieces 53a should be a necessary minimum for decreasing the rigidity in the radial direction of the inward flange 53.

Furthermore, particularly, in the case where the rotation prevention plates 63 are brought into contact with the inward flange 53 in the axial direction and mounted to the inward flange 53 as in the example shown in FIG. 3, it is difficult to effectively decrease the rigidity in the circumferential direction of the inward flange 53 even when only the inward flange recesses 58 are made deeper, and the necessity to form recesses having substantially equal depths also on the rotation prevention plates 63 arises. However, since the rotation prevention plates 63 that are plate-like members do not have cylindrical portions as with the flex support 27, when recesses having substantially equal depths are formed also on the rotation prevention plates 63, the dimensions in the radial direction of the rotation prevention plates 63 are insufficient to ensure desired strength.

Moreover, although the intervals (pitches) at which the deep inward flange recesses 58B are provided are not limited to the shown example, the deep inward flange recesses 58B are preferably provided at a ratio that is one deep inward flange recess 58B for a plurality of inward flange recesses 58. Specifically, each of the intervals at which the deep inward flange recesses 58B are provided is preferably in the range of 2 pitches to 5 pitches and more preferably 3 pitches.

First, in the case where the number of the pitches is small, falling deformation and torsional deformation of the projection pieces 53a cannot be effectively suppressed as described above. On the other hand, in the case where the number of the pitches is large, the discontinuity of portions having low rigidity increases with respect to the entire periphery of the inward flange 53 of the flex support 27. In this case, stress due to revolution of the planet gears 7 acts locally, and the ring gear 9 does not deform into a smooth shape but deforms into an angular shape, which may have an adverse effect on meshing of the gears. In consideration of this, portions having low rigidity are preferably arranged evenly over the entire periphery of the inward flange 53.

Furthermore, particularly, in the case where co-rotation of the connection nuts 61 is prevented by using the rotation prevention plates 63 as in the present embodiment, two or more fixing pins 67 need to be provided on the outer peripheral portion of one rotation prevention plate 63 and at positions spaced apart from each other in the circumferential direction as described above, but it is difficult to provide the fixing pins 67 at the deep inward flange recesses 58B. That is, these fixing pins 67 are arranged at the outer diameter side of the shallow inward flange recesses 58A so as to be spaced apart from each other in the circumferential direction. The fixing pins 67 may be omitted.

From the standpoint of the above, the proportion of a portion in the circumferential direction between the deep inward flange recesses 58B to the entire periphery, that is, the proportion of a portion in the circumferential direction in which one rotation prevention plate 63 is disposed, relative to the entire periphery, may be set to any proportion, but is preferably in the range of one-twentieth to one-twelfth and more preferably in the range of one-seventeenth to one-fifteenth. That is, the number of the rotation prevention plates 63 provided over the entire periphery is preferably in the range of 12 to 20 and preferably in the range of 15 to 17. In this state, each of the intervals at which the deep inward flange recesses 58B are provided is preferably in the range of 2 pitches to 5 pitches and more preferably 3 pitches.

In addition, in the present embodiment, since the rotation prevention plates 63 are provided, the inward flange recesses 58 located at the portions in the circumferential direction at which no rotation prevention plate 63 is present are set so as to be deeper than the circumference A of the virtual circle that circumscribes the plurality of the bolt insertion holes 59 provided in the inward flange 53 as shown in FIG. 7. On the other hand, the inward flange recesses 58 located at the portions in the circumferential direction at which the rotation prevention plates 63 are present are set so as to be shallower than the circumference A of the virtual circle. The deep inward flange recesses 58B may be deep to the extent that the deep inward flange recesses 58B reach the inner peripheral surface of the large-diameter cylindrical portion 43 of the flex support 27.

Figure 10:
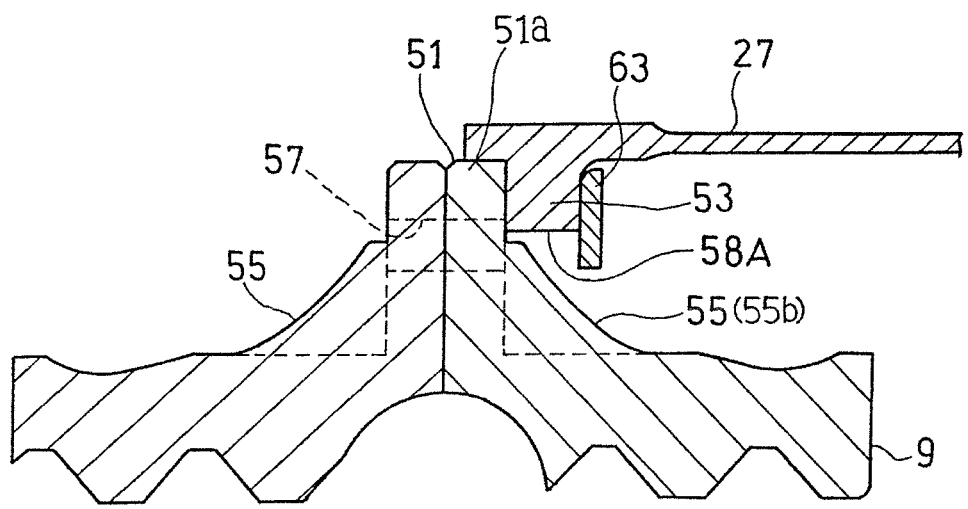
FIG. 10 is a longitudinal cross-sectional view showing an area surrounding a recess of the inward flange of the flex support in FIG. 2 in an enlarged manner.

Regardless of presence or absence of the rotation prevention plates 63, the shallow inward flange recesses 58A may be set to any depth as long as interference with the connection wall 55 of the outward flange 51 of the ring gear 9 is avoided as shown in FIG. 10. However, as shown in FIG. 7, in the case where the shallow inward flange recesses 58A are set so as to be shallower than the circumference A of the virtual circle, since portions at the inner diameter side with respect to the circumference A of the virtual circle are present at the bottom portion of these recesses 58A, moment arms with respect to loads received from the connection bolts 65 can be reduced. Thus, bending stress in the circumferential direction can be effectively suppressed. Furthermore, the portions that are at the bottom portions of these recesses 58A and at the inner diameter side with respect to the circumference A of the virtual circle are strongly in contact with the flange surface of the outward flange 51 of the ring gear, and thus torsional deformation of the above-described projection pieces 53*a* can also be effectively suppressed.

As shown in FIG. 8, the inner diameter side edge portion of each rotation prevention plate 63 is formed in a wavy shape having projections 63*a* projecting in the radial direction of the flex support 27 and recesses 63*b* (hereinafter, referred to as rotation prevention plate recesses) recessed in the radial direction, and the rotation prevention plate recesses 63*b* are located such that the positions in the circumferential direction of the rotation prevention plate recesses 63*b* correspond to the positions in the circumferential direction of the inward flange recesses 58 of the flex support 27. The rotation prevention plate recesses 63*b* are set so as to be shallower than the inward flange recesses 58 of the flex support 27. Thus, the strength of the rotation prevention plate 63 made of plate-like member that does not have tubular portions is sufficiently ensured.

In the present embodiment, the example, in which the rotation prevention plates 63 are provided to efficiently perform the work for connecting the ring gear 9 and the flex support 27, has been described. However the rotation prevention plates 63 may be omitted.

In the planetary gear device 1 according to the above embodiment, since the wavy outward flange 51 is provided at the outer peripheral portion of the ring gear 9, the weight of the planetary gear device 1 can be reduced while desired rigidity of the ring gear 9 is ensured. In addition, by making the depth of the recesses 58 between the projection pieces 53*a* of the flex support 27, which is the tubular support member, greater at regular intervals, the rigidity in the radial direction of the entire inward flange 53 of the flex support 27 is reduced while the rigidity of the projections pieces required with respect to the driving torque is ensured, so that the flex support 27 can be caused to easily follow deformation of the ring gear 9. Accordingly, even when a radial load generated by revolution of the planet gears 7 is received, the displacement difference between the inward flange 53 of the flex support 27 and the outward flange 51 of the ring gear 9 is reduced, so that occurrence of fretting between the flange surfaces can be prevented.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Planetary gear device
3 . . . Input shaft
5 . . . Sun gear
7 . . . Planet gear
9 . . . Ring gear
27 . . . Flex support (Tubular support member)
51 . . . Outward flange
53 . . . Inward flange
53*a* . . . Projection piece of inward flange
58 . . . Recess of inward flange
58A . . . Shallow inward flange recess (first recess)
58B . . . Deep inward flange recess (second recess)
59 . . . Bolt insertion hole
61 . . . Connection nut (nut)
63 . . . Rotation prevention plate
65 . . . Connection bolt (bolt)
67 . . . Fixing pin
A . . . Circumference of virtual circle that circumscribes a plurality of bolt insertion holes

What is claimed is:

1. A planetary gear device comprising:
a sun gear having external teeth and coaxially fixed to a power input shaft;
a plurality of planet gears each having external teeth and meshing with the sun gear;
a ring gear having internal teeth and meshing with the plurality of planet gears;
a tubular support member connected to the ring gear so as to rotate together with the ring gear and supporting the ring gear;
an outward flange provided at the ring gear so as to project radially outward and extend over an entire periphery of the ring gear; and
an inward flange of a wavy shape provided at the tubular support member and having a plurality of projection pieces projecting radially inward over an entire periphery of the tubular support member,
wherein the outward flange and the inward flange are fastened to each other by means of bolts and nuts thereby to connect the ring gear and the tubular support member to each other, and
the inward flange has a plurality of recesses formed between the plurality of projection pieces and the plurality of recesses include shallow first recesses and second recesses deeper than the first recesses such that depth of the recesses becomes greater at regular intervals.

2. The planetary gear device as claimed in claim 1, wherein the inward flange is formed with a plurality of bolt insertion holes through which the bolts are inserted, the second recesses are set so as to be deeper than a circumference of a virtual circle that circumscribes the plurality of bolt insertion holes, and the first recesses are set so as to be shallower than the circumference of the virtual circle.

3. The planetary gear device as claimed in claim 1, wherein a plurality of rotation prevention plates configured to prevent the nuts from being loosened are mounted on the inward flange so as to be spaced apart from each other at a predetermined interval in a circumferential direction, and
the second recesses are located in the inward flange at portions in the circumferential direction at which no rotation prevention plate is present and the first recesses are located in the inward flange at portions in the circumferential direction at which the rotation prevention plates are present so that depth of the recesses becomes greater at regular intervals.

4. The planetary gear device as claimed in claim 3, wherein one rotation prevention plate is provided for two to five nuts arranged continuously, and one second recess is formed every two to five recesses located continuously.

5. The planetary gear device as claimed in claim 3, wherein each rotation prevention plate has an inner diameter side edge portion formed in a wavy shape having projections projecting in a radial direction of the tubular support member and recesses recessed in the radial direction of the tubular support member, and is disposed such that circumferential positions of the recesses of the rotation prevention plate correspond to circumferential positions of the recesses of the inward flange, and the recesses of each rotation prevention plate are shallower than the recesses of the inward flange.

6. The planetary gear device as claimed in claim 3, wherein each rotation prevention plate is mounted on the inward flange via a plurality of fixing pins provided to the inward flange, and the plurality of the fixing pins are disposed at an outer diameter side of the first recesses so as to be spaced apart from each other in a circumferential direction.

* * * * *